March 5, 1935. W. B. FLOYD ET AL 1,993,655
CENTRIFUGAL CASTING METHOD AND APPARATUS
Filed May 5, 1933 12 Sheets-Sheet 3

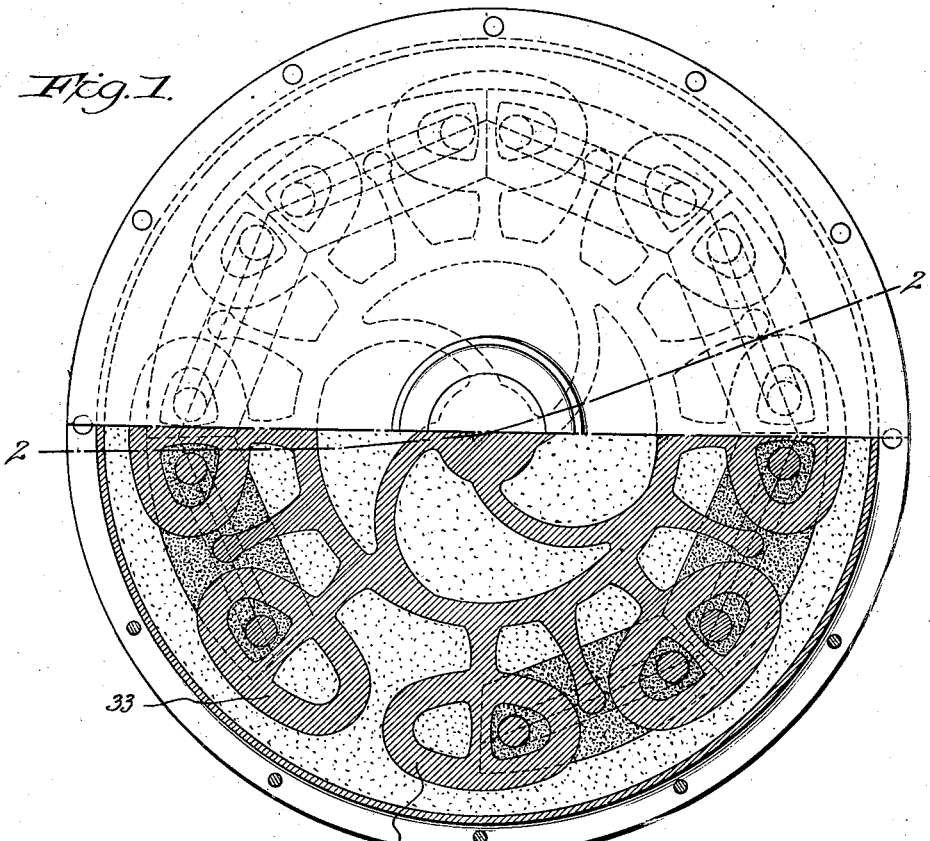
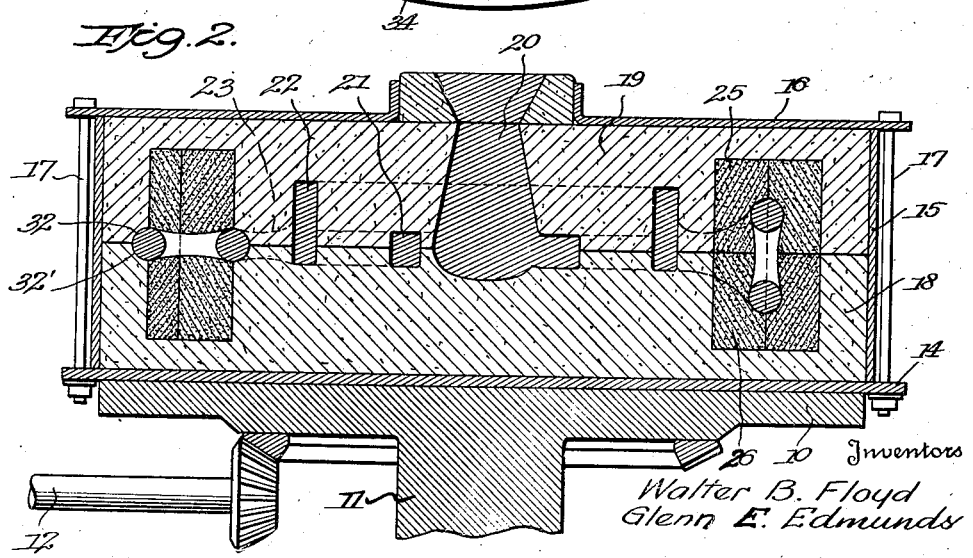

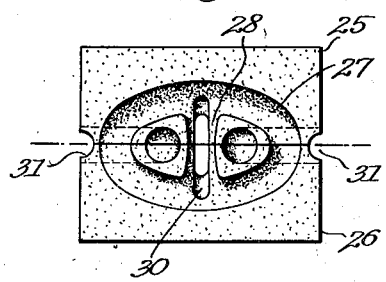
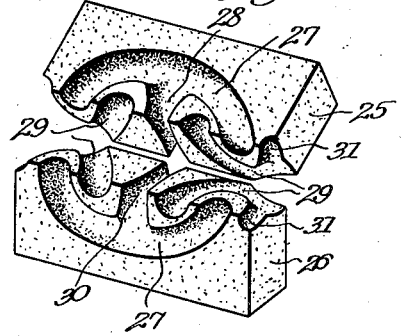
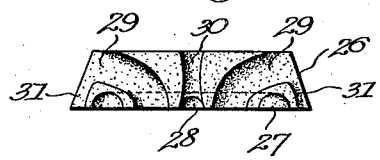
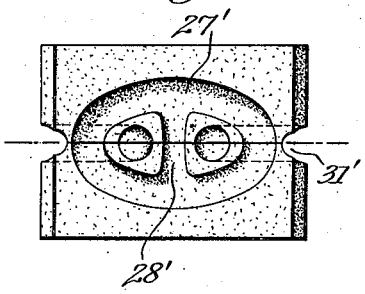
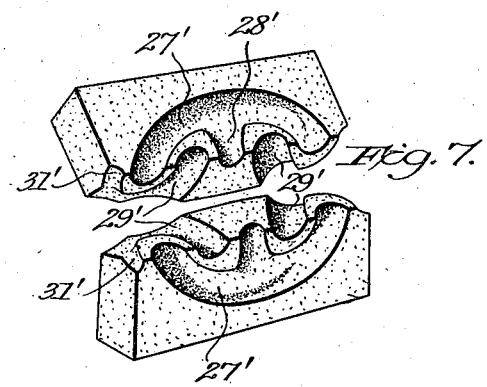

Inventors
Walter B. Floyd
Glenn E. Edmunds
By Cushman, Darby, & Cushman
Attorneys March 5, 1935. W. B. FLOYD ET AL 1,993,655
CENTRIFUGAL CASTING METHOD AND APPARATUS
Filed May 5, 1933 12 Sheets-Sheet 4
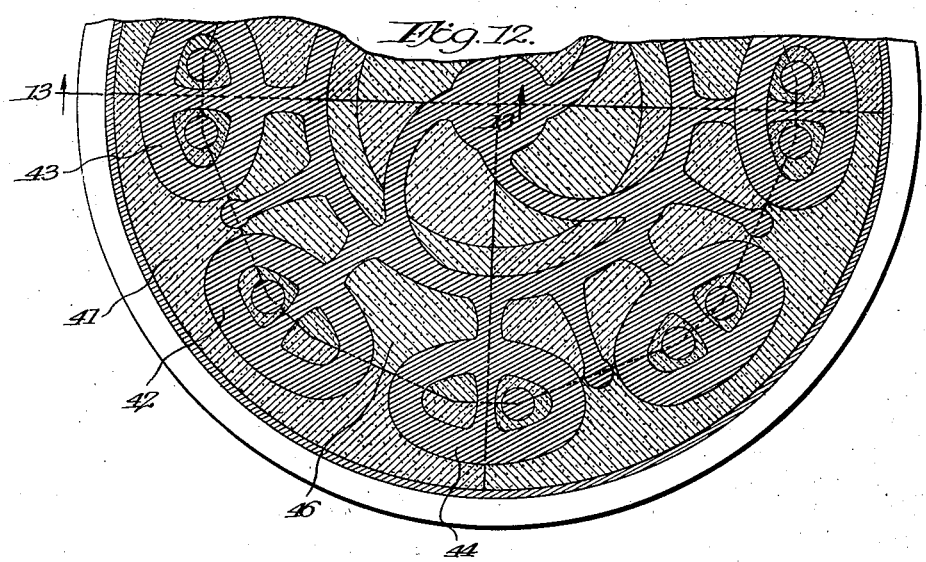
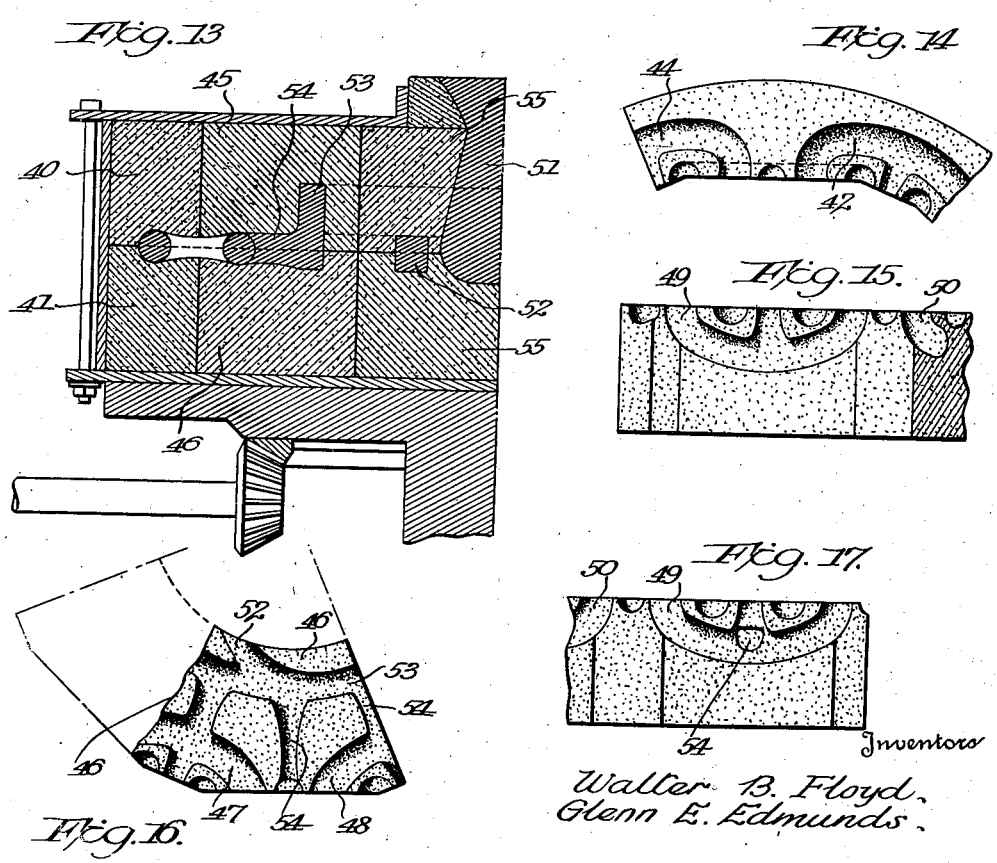
Inventors
Walter B. Floyd.
Glenn E. Edmunds.

March 5, 1935. W. B. FLOYD ET AL 1,993,655
CENTRIFUGAL CASTING METHOD AND APPARATUS
Filed May 5, 1933 12 Sheets-Sheet 5
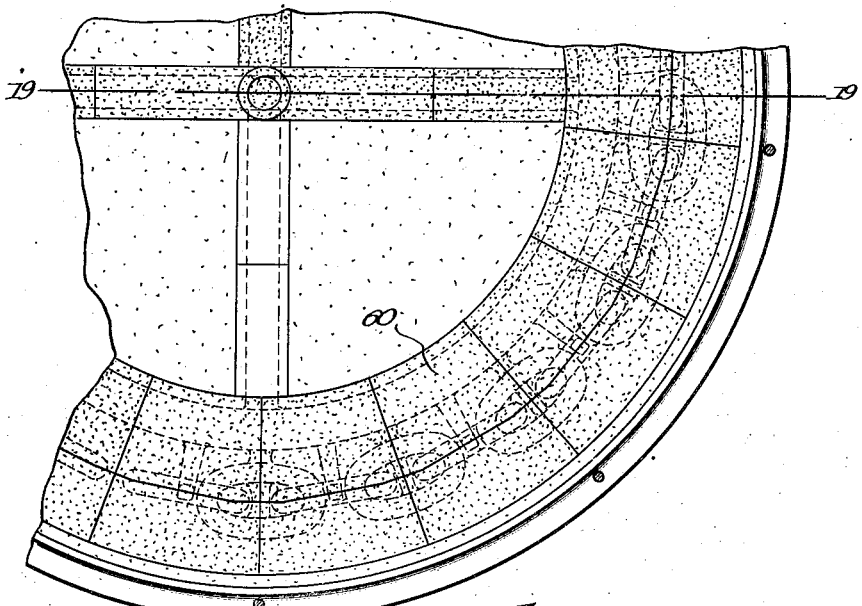
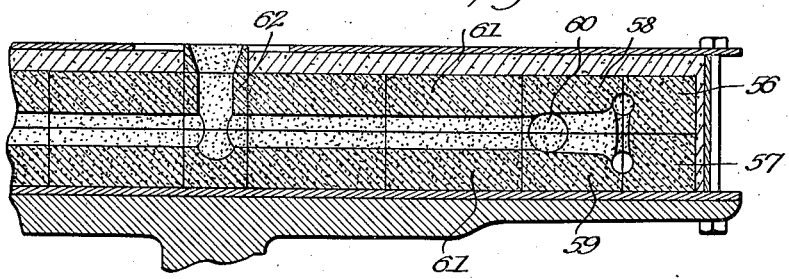
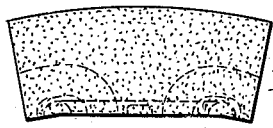
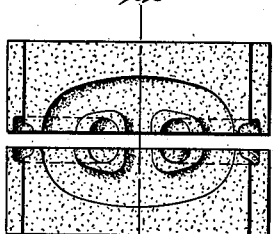
Inventors
Walter B. Floyd,
Glenn E. Edmunds,
Attorneys March 5, 1935. W. B. FLOYD ET AL 1,993,655
CENTRIFUGAL CASTING METHOD AND APPARATUS
Filed May 5, 1933 12 Sheets-Sheet 6
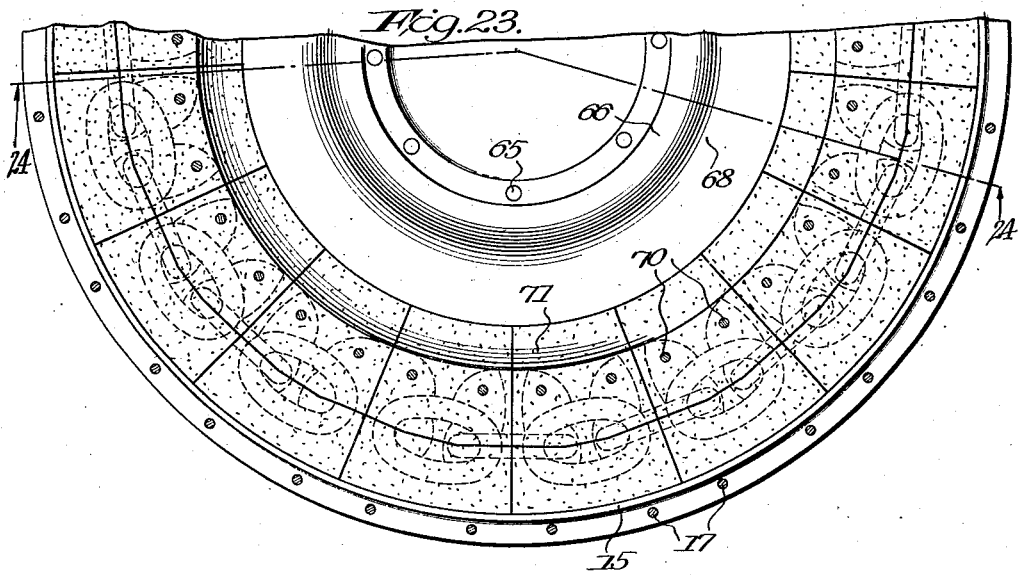
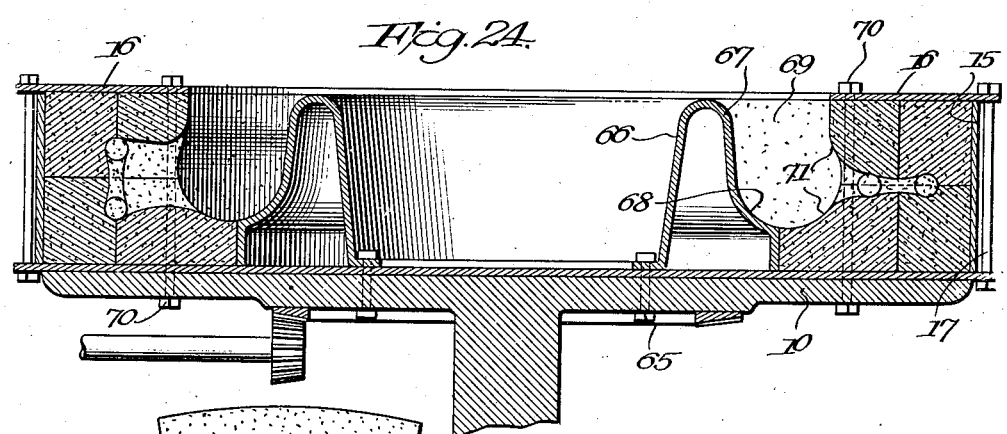
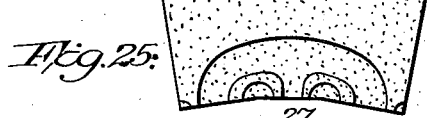
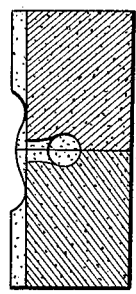
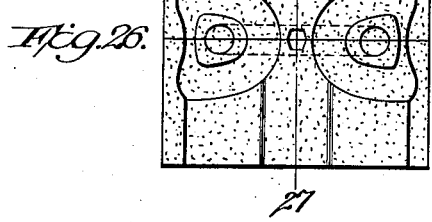
Inventors
Walter B. Floyd
Glenn E. Edmunds
By Cushman, Darby & Cushman
Attorneys March 5, 1935.  W. B. FLOYD ET AL  1,993,655
CENTRIFUGAL CASTING METHOD AND APPARATUS
Filed May 5, 1933   12 Sheets-Sheet 7

Inventors
Walter B. Floyd.
Glenn E. Edmunds.

By Cushman, Darby & Cushman
Attorneys

March 5, 1935. W. B. FLOYD ET AL 1,993,655
CENTRIFUGAL CASTING METHOD AND APPARATUS
Filed May 5, 1933 12 Sheets-Sheet 8

Inventors
Walter B. Floyd
Glenn E. Edmunds

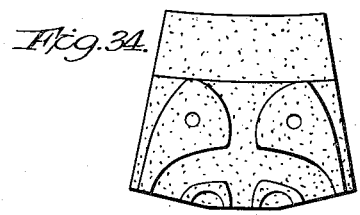
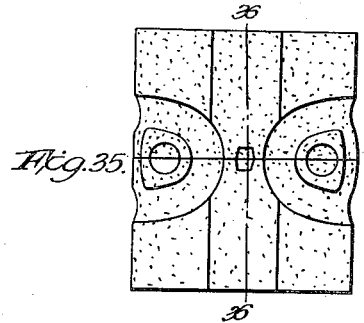
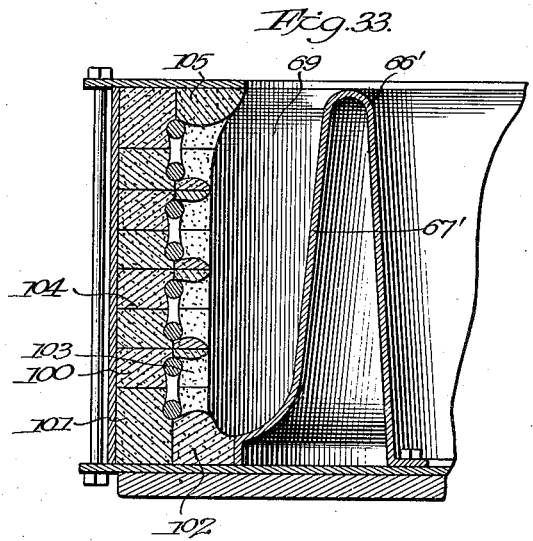
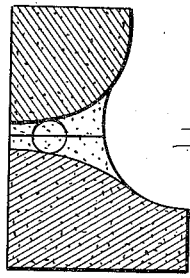
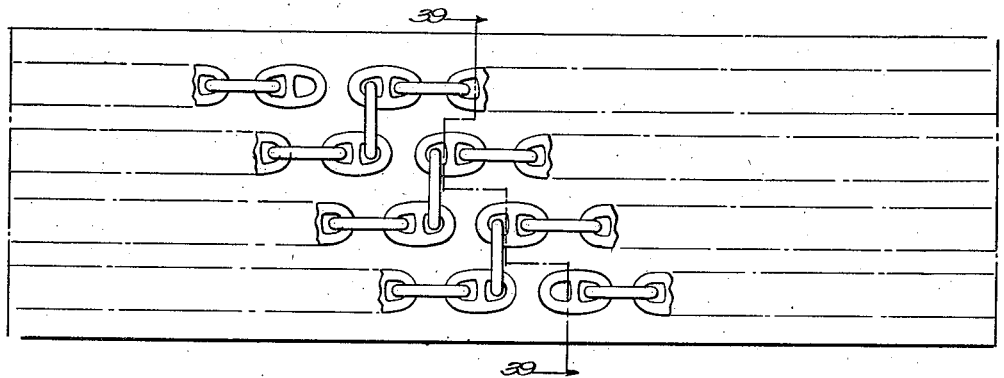

March 5, 1935. W. B. FLOYD ET AL 1,993,655
CENTRIFUGAL CASTING METHOD AND APPARATUS
Filed May 5, 1933 12 Sheets-Sheet 10
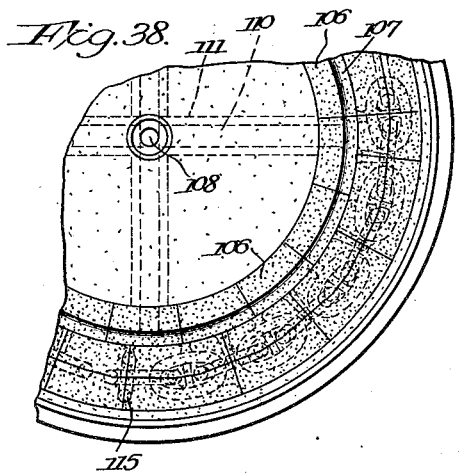
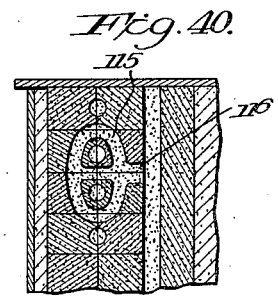
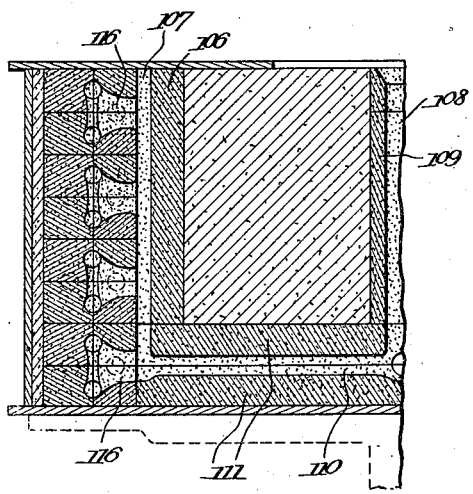
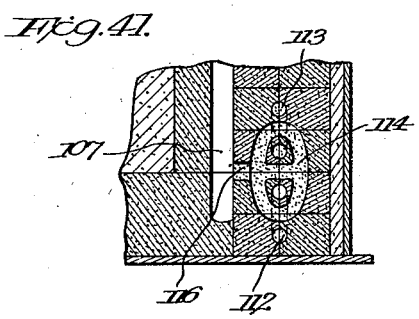
Inventors
Walter B. Floyd.
Glenn E. Edmunds.

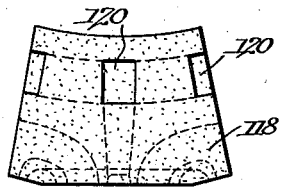
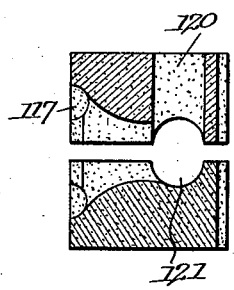
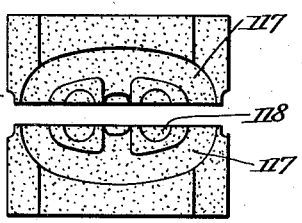
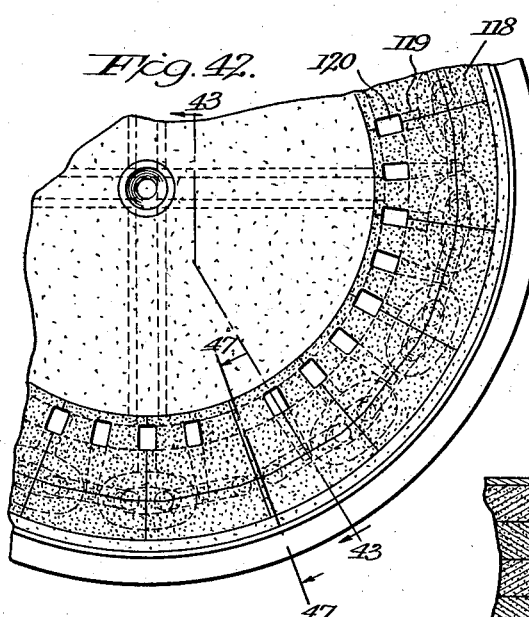
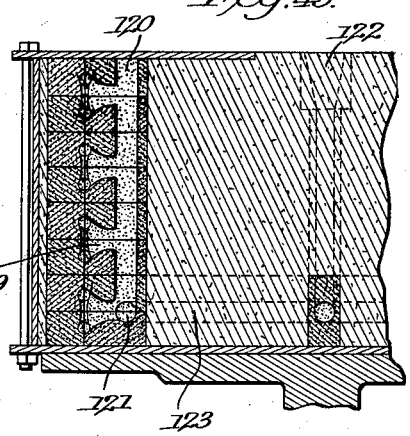
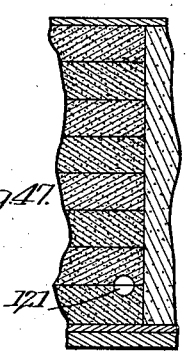

March 5, 1935.  W. B. FLOYD ET AL  1,993,655
CENTRIFUGAL CASTING METHOD AND APPARATUS
Filed May 5, 1933   12 Sheets-Sheet 12
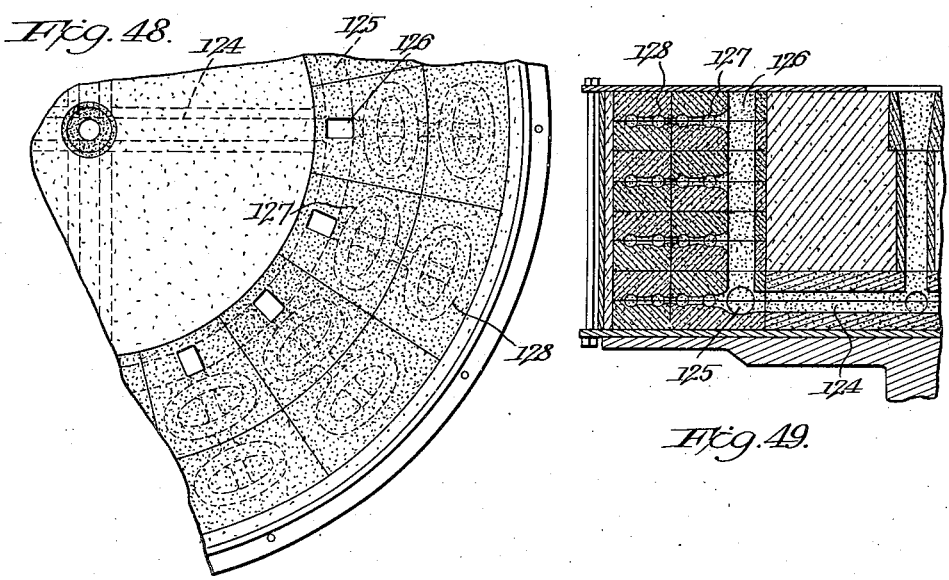
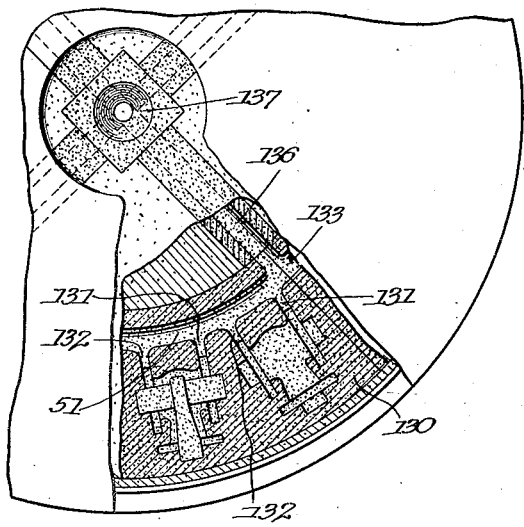
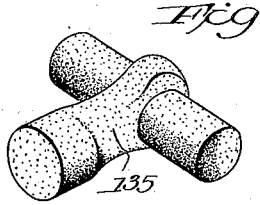
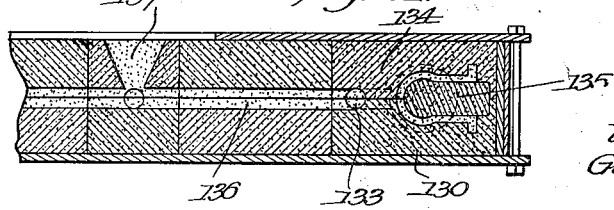

Patented Mar. 5, 1935

1,993,655

UNITED STATES PATENT OFFICE 1,993,655

CENTRIFUGAL CASTING METHOD AND APPARATUS

Walter B. Floyd and Glenn E. Edmunds, Columbus, Ohio, assignors to The Bonney-Floyd Company, Columbus, Ohio, a corporation of Ohio Application May 5, 1933, Serial No. 669,612

35 Claims. (Cl. 22—209)

This invention relates to methods and apparatus for centrifugally casting articles. More particularly, it relates to methods and apparatus for centrifugally casting chain links, although certain features of the invention have great usefulness in casting many other articles, such, for instance, as bars, ingots, blooms, and valve bodies.

It is an object of the present invention to provide a method of, and apparatus for, centrifugally casting a plurality of articles, which articles will have greatly improved characteristics as to uniformity, density of material, and freedom from flaws.

A generic feature of the invention consists in providing a plurality of article molding cavities which are mounted for revolution about a vertical axis, and which are filled with molten metal under the influence of centrifugal force, and in which the metal is maintained under the influence of centrifugal force until it has at least partially cooled and has solidified. Thus, in each cavity a uniformly dense, compact casting is produced.

Certain features of the invention will be advantageous in the centrifugal casting of circular blooms, and the like. It will be apparent that, in such a case, a continuous, annular mold cavity will be used instead of a plurality of separate, circumferentially aligned mold cavities.

It is a further object of the invention to compensate for cooling shrinkage of the metal in each of the article forming cavities by the admission thereto of additional metal under the influence of centrifugal force, from a reservoir adjacent thereto and containing an adequate supply of such additional metal.

It is a further object of the invention to equalize the pressure of centrifugal force in all of the cavities by establishing free communication from one to another, through an annular passage or reservoir located adjacent to each, so that uniformly dense castings are produced in all of the cavities.

It is an object of the invention to cast centrifugally individual, independent chain links, each of which will be characterized by greater strength and density of material than is possible with conventional chain link casting methods.

It is a further object of the invention to produce simultaneously a plurality of interlocking chain links by a centrifugal casting process, thereby attaining the inherent advantages of centrifugal casting in the art of chain making.

It is a further object of the invention to simultaneously produce a plurality of independent short lengths or shots of chain by centrifugal casting, and, in some cases, to produce at the same time, interconnecting links for the different shots, and to produce, in one casting operation, an unusually long stretch of interlocking chain links.

It is a further object of the invention to join together by a centrifugal casting operation, a plurality of previously centrifugally cast shots of chain.

The invention comprises generic features of both method and apparatus, and a plurality of specifically different methods and apparatus, for accomplishing the above and other objects. In the drawings, a number of embodiments of apparatus capable of performing the method of the present invention are disclosed, but it must be understood that the drawings are illustrative only, and the invention is in no sense limited to the details thereof. Many changes in method, and modifications of apparatus, will readily occur to one skilled in the art after a consideration of the principles set forth herein, and all such changes as fall within the scope of the appended claims, or their equivalents, are within the present invention.

In the drawings,

Figure 1 is a top plan view, partly in horizontal section, showing an apparatus for centrifugally casting a shot of interlocking chain links.

Figure 2 is a vertical sectional view taken on line 2—2 of Figure 1.

Figure 3 is an outer face view of a radially inner pair of mold cores of Figures 1 and 2.

Figure 4 is an isometric view of the cores of Figure 3, separated along the horizontal parting line.

Figure 5 is top plan view of the lower core of Figure 3.

Figure 6 is an inner face view of an outer pair of cores disclosed in Figures 1 and 2.

Figure 7 is an isometric view of the cores of Figure 6, separated along the horizontal parting line.

Figure 8 is a top plan view of the lower core of Figures 6 and 7.

Figure 12 is a fragmentary horizontal sectional view of another form of apparatus for centrifugally casting a plurality of interlocking links to form a shot of chain.

Figure 13 is a vertical sectional view taken on line 13—13 of Figure 12.

Figure 14 is a fragmentary top plan view of a lower, outer mold section of Figures 12 and 13.

Figure 15 is an inner face view of Figure 14.

Figure 16 is a fragmentary top plan view of a lower inner mold section of Figures 12 and 13.

Figures 17 is an outer face view of the mold of Figure 16.

Figure 18 is a top plan view, with the cover plate removed, of another form of apparatus for centrifugally casting a plurality of interlocking chain links.

Figure 19 is a vertical sectional view taken on the line 19—19 of Figure 18.

Figure 20 is a top plan view of an outer pair of mold sections used in the apparatus of Figures 18 and 19.

Figure 21 is an inner face view of sections shown in Figure 20.

Figure 22 is a vertical sectional view taken on line 22—22 of Figure 21.

Figure 23 is a top plan view of a different form of apparatus for centrifugally casting a plurality of interconnected chain links.

Figure 24 is a vertical sectional view taken on line 24—24 of Figure 23.

Figure 25 is a plan view of the upper surface of a lower outer mold section or core which may be used with this form of apparatus.

Figure 26 is an inner vertical face view of an outer pair of mold sections.

Figure 27 is a sectional view taken on line 27—27 of Figure 26.

Figure 33 is a fragmentary vertical sectional view of an apparatus for simultaneously casting a plurality of shots of chain in tiers.

Figure 34 is a plan view of the top of one of the lower inner mold sections which is used in Figure 24.

Figure 35 is an outer vertical face view of an inner pair of mold sections used in Figure 24.

Figure 36 is a sectional view taken on line 36—36 of Figure 35.

Figure 37 is a diagrammatic elevational view of a preferred relation of link mold cavities arranged in tiers, and showing a manner in which the shots of chain may be interconnected from tier to tier.

Figure 38 is a fragmentary plan view of another form of apparatus adapted to centrifugally cast in a single operation a plurality of shots of chain in tiers, with a link interconnecting the end link of one tier with a corresponding end link of the tier thereabove, in accordance with the general arrangement of Figure 37.

Figure 39 is a vertical sectional view of the apparatus of Figure 38 taken on a line staggered somewhat from tier to tier, substantially as shown by line 39—39 of Figure 37.

Figure 40 is a fragmentary vertical sectional view through the assembled mold sections of Figure 38, showing the vertically disposed link cavity connecting the uppermost tier of link cavities with the tier immediately therebelow.

Figure 41 is a view similar to Figure 40 but showing the vertically disposed link cavity connecting an end link of the lowermost tier with a corresponding link cavity of the tier thereabove.

Figure 42 is a top plan view, with the cover plate removed, of another form of apparatus for centrifugally casting, in one operation, a plurality of independent shots of chains in tiers.

Figure 43 is a vertical sectional view on line 43—43 of Figure 42.

Figure 44 is a plan view of an inner pair of mold sections which may be used in the apparatus of Figure 42.

Figure 45 is a vertical outer face view of the mold sections of Figure 44.

Figure 46 is a vertical sectional view of the same molds.

Figure 47 is a fragmentary vertical sectional view taken on line 47—47 of Figure 42.

Figure 48 is a fragmentary plan view of an apparatus adapted to centrifugally cast simultaneously a plurality of individual, interconnected chain links in mold cavities disposed in tiers and in concentric rows.

Figure 49 is a vertical axial sectional view of the apparatus of Figure 48.

Figure 50 is a plan view, partly in section, of an apparatus for centrifugally casting a plurality of objects other than chain links, such as valve bodies.

Figure 51 is a vertical axial sectional view of Figure 50, taken on line 51—51 thereof.

Figure 52 is an isometric view of a core which may be used with the apparatus of Figure 50 to form the hollow interior of the valve body.

Figure 9:
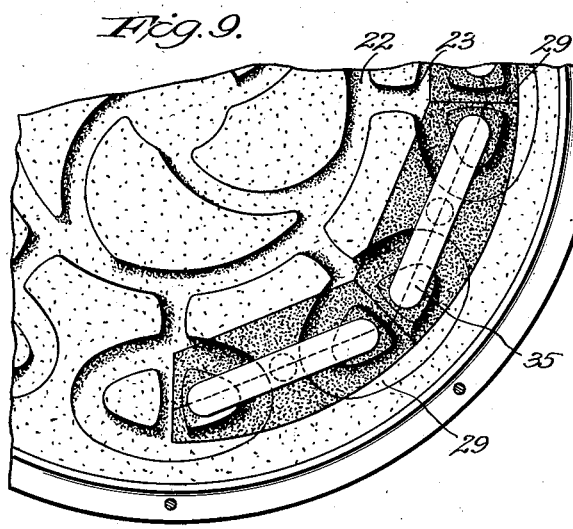
Figure 9 is a fragmentary horizontal sectional view of an apparatus similar to Figure 1, but adapted to centrifugally cast a plurality of chain links in interlocking relation to a plurality of precast chain links.

As stated at the outset of this specification, the primary object of the invention is to produce, by a centrifulgal operation, a cast chain which is superior in many respects to chain cast in the ordinary manner, by pouring molten metal into stationary molds. Cast chain made according to conventional practice often has a number of serious defects, among the most common of which are flaws or cavities which result from the trapping of air or gas in the mold. Another serious defect of such cast chains is the unstable condition of the metal, resulting from stresses and stains set up by cooling shrinkage of the metal in the casting molds. Since the molten metal in a stationary mold cools and solidifies from the outside, inwardly, contracting forces are set up, and it has always been a problem to supply additional metal to relieve these forces and to compensate for the shrinking tendency at the interior of the cast body. In the casting of chain, these defects have been particularly noticeable because of the relatively small cross-sectional area of the link forming mold cavities with respect to their linear extent, and also because the finished product must be made so as to withstand extreme tensional strains.

The present invention entirely overcomes the defects of prior art conventional methods of chain casting because, by maintaining the molten metal in the mold cavities under the influence of centrifugal force, such pressures are produced as to render impossible the formation of flaws due to gas or air bubbles. Furthermore, cooling shrinkage forces are compensated for in the present invention by supplying additional metal to the mold cavities under the influence of centrifugal force during cooling of the castings.

A number of specific forms of apparatus are disclosed in the accompanying drawings for the purpose of illustrating a plurality of ways in which the method of the present invention may be practiced. Although the forms differ specifically, they will have certain generic features in common.

Referring to Figures 1 to 8, inclusive, an apparatus is disclosed for centrifugally casting a plurality of chain links in interlocked relation. A substantially circular table 10 is mounted upon the upper end of a post 11 for rotation about a vertical axis by any appropriate driving means, such as a ring and pinion gear connection to driving shaft 12. Upon the upper surface of the table 10, there is secured a plate 14, a cylindrical casing 15, and a cover plate 16, secured together by bolts 17, or the like. These parts comprise a cylindrical flask mounted for rotation upon a vertical axis.

Within the flask are a plurality of mold and core sections having surfaces shaped to form a plurality of vertically and horizontally disposed link cavities in interlocking relation, a radially disposed gate for each cavity, an annular molten metal reservoir connected to the gates, a plurality of runners leading inwardly from the reservoir, and an axial pouring basin at the inner ends of the runners. A drag mold section 18 is supported upon the bottom plate 14 of the flask, and has grooves or depressions formed therein adapted to cooperate with other surfaces of the cope section 19 to form certain of the above mentioned passages. These grooves and surfaces are formed in the usual manner of making cope and drag mold sections by means of preformed patterns. A central pouring basin 20 is formed primarily in the cope section, but has its bottom in the drag. The runners 21, ring reservoir 22, and the inner ends of the gates 23 are formed by mating depressions in the cope and drag sections.

A plurality of sets of four-part link forming molds or cores are placed in appropriate recesses in the cope and drag sections. Preferably, the cores are placed upon the drag in assembled relation, and the cope then lowered into place.

Each set of mold sections is substantially identical to the next, and consequently, a description of one set will suffice.

Referring to Figures 3 to 5, the radially inner pair of cores 25, 26 have their vertical outer faces provided with grooves which are shaped to form one-half of a vertical link cavity 27, including a cross stud forming cavity 28. The horizontal meeting surfaces of these core members are provided with grooves or depressions shaped to form two substantially one-quarter, horizontal link cavities 29. Between the depressions 29 and extending transversely of the mold sections, other grooves 30 are formed, for the purpose of cooperating with certain of the gates 23 to feed metal to the cross stud forming cavity 28 and thence to the vertical link cavities.

The outer pair of core sections is similar in many respects to the inner pair. Referring to Figures 6 to 8, it will be seen that the vertical inner face of each of these members is provided with depressions 27' adapted to cooperate with the depressions 27 to complete the vertical link forming cavity, and with grooves 28' which, when associated with the corresponding surfaces of the inner sections, form the cross stud for the vertical link.

The horizontal meeting surfaces of the outer pair of cores are provided with grooves 29' which cooperate with the grooves 29 to form substantially one-half of a pair of horizontal link forming cavities. The cross studs for the horizontally disposed links are formed by the surfaces 31, 31', respectively, at the ends of the inner and outer pairs of cores.

Since the horizontal link forming cavities are not complete in the core sections, it is necessary to form the surfaces of the cope and drag mold sections adjacent to the cores with depressions adapted to complete these cavities. Such surfaces are shown at 32, 32', of Figure 2. The cope and drag sections are further provided with cavities adapted to form the end links 33, 34 of the shot of chain, because core sections are unnecessary at these points, since no interlocking, vertically disposed link is formed.

When the cores are assembled in substantially the manner disclosed in Figures 1 and 2, and the cope section placed in proper relation, and the parts firmly clamped together by the bolts 17, the apparatus is ready for operation. The table 10 may be rotated, and a measured amount of molten metal poured into the basin 20, or a sufficient amount of metal may be poured before rotation is started. In any event, the metal will flow from the basin outwardly through the runners 21 where it will completely fill the annular reservoir 22. From this point, the metal will flow through each of the gates 23 to the horizontally and vertically disposed, independent, interlocking link cavities. Since the cope and drag and the core sections are made of sand, entrapped air and gas will flow through the pores thereof, and also along the parting planes of the molds. The centrifugal force exerted upon the molten metal by reason of the rotation of the table and the mold will cause the molten metal to be maintained in the mold cavities under substantial pressure, and this pressure will positively force any entrapped bodies of air or gas outwardly through the material of the mold. Thus, the formation of flaws is practically impossible.

The close proximity of the annular reservoir 22 to each of the mold cavities, and the free communication from one cavity to another through that reservoir assures that the metal will be under equal pressure in all of the cavities. This reservoir consequently is useful not only as a means for facilitating feeding of the metal to the individual link forming cavities, but also as a means for producing uniformity in the finished castings.

The rotation of the table and the mold is continued, and the metal subjected to continued centrifugal force until the same has at least partially cooled and solidified. The contracting and shrinkage forces which are set up during the cooling of the metal in the mold cavities are entirely relieved by the supply to each cavity of additional metal, as needed, from the ring reservoir 22 and the short gates 23. Thus, an unstable chain link having the material thereof under the tension of cooling stresses will not be produced by the method of the present invention.

In order to secure the desired results of the present invention, a sufficient amount of metal should be poured into the mold to fill each of the link cavities, the gates 23, and the reservoir 22. In some cases, it will be found desirable to pour an excess of metal, so as to fill the runners 21 and the pouring basin 20, but in most cases, this will be unnecessary.

After the metal has at least partially cooled and completely solidified, the rotation of the table is stopped, and the mold broken away from the casting in the usual manner. The solidified metal in the gates and any fins or other imperfections are trimmed off in the usual manner. The result will be a short length or shot of centrifugally cast chain having marked advantages from the point of view of uniformity and density of material, great tensile strength, and complete absence from flaws.

In Figure 9, an apparatus is disclosed for casting a plurality of horizontally disposed chain links in interlocking relation to a plurality of previously cast chain links which are positioned in vertical relation in the core cavities. This apparatus is substantially identical to the apparatus of Figures 1 and 2, and differs therefrom only in that the gates leading from the ring reservoir to the cross studs of the vertically disposed link forming cavities are omitted.

Figure 10:
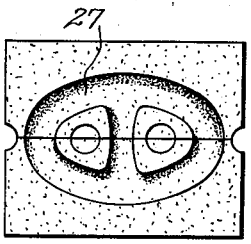
Figure 10 is an outer face view of the inner pair of cores used in the device of Figure 9.

The inner pair of mold cores are shown in Figure 10, and it will be noted that the cores are duplicates of the cores shown in Figure 3, except that the gate 30 is omitted.

Precast chain links 35 are placed in the vertical link cavities 27 of the sets of cores, and the parts assembled as shown in Figure 9. The cope section is put in place, and molten metal will flow by centrifugal force from the central pouring basin 20 through the runners to the ring reservoir 22, and then through the short radial gates 23 to the horizontally disposed link forming cavities 29. After the molten metal in these cavities has solidified, the rotation of the table will be stopped, and it will be found that the precast links 35 are interlocked with alternate new, centrifugally cast links.

Figure 11:
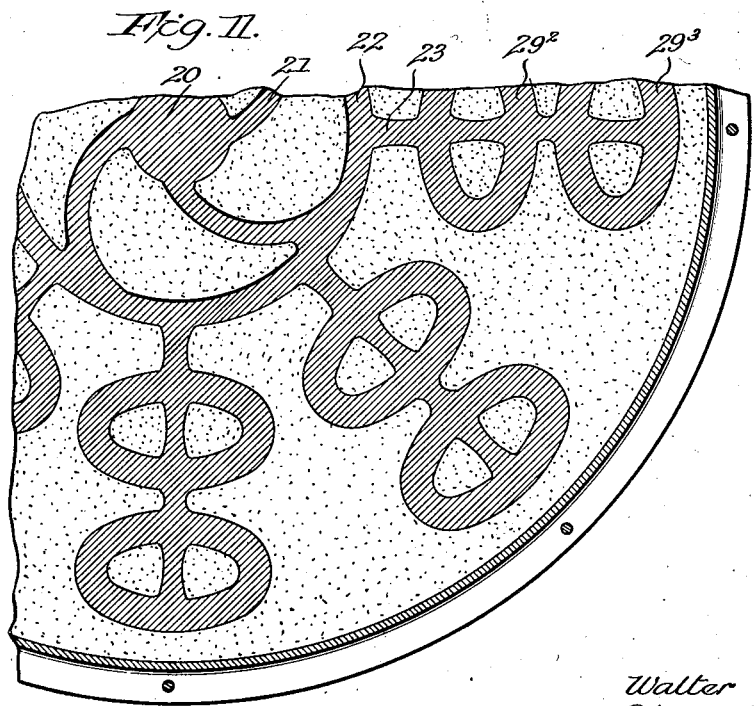
Figure 11 is a horizontal sectional view, taken substantially between the cope and drag sections, of a mold for centrifugally casting a plurality of individual chain links.

In Figure 11, an apparatus is disclosed which is adapted to form a plurality of independent chain links by a centrifugal casting method. These links may conveniently be used as the precast links required in the method of Figure 9. Since no interlocking relation of link cavities need be provided in this process, it is unnecessary to use preformed cores, but, on the other hand, a mold comprising simple cope and drag sections will suffice. By means of an appropriate pattern, depressions are formed in the upper surface of the drag section to provide a central pouring basin 20, outwardly disposed runners 21, an annular reservoir 22, radial gates 23, and link forming mold cavities 29², 29³. One or more circumferentially aligned rows of such cavities may be provided, and in Figure 11, two concentric rows are disclosed. It has been found convenient to feed the outermost rows by communication with the inner rows at points adjacent the cross stud forming cavities.

In the apparatus of Figures 12 to 17, a somewhat different arrangement of mold sections is provided. In this case, the link forming cavities are not formed in core sections adapted to be positioned between cope and drag mold sections, but, on the other hand, are formed on adjacent surfaces of preformed mold sections which may be assembled to form the complete mold. Preferably, the sections are assembled in sets, each of which forms one-quarter of the cylindrical mold, although they may be assembled to form a smaller sector of the cylinder. The outer pair of mold sections 40, 41 have their horizontal meeting surfaces provided with surfaces shaped to form substantially half of one horizontal link 42 and substantially one-quarter of each of two additional horizontal links 43, 44. These links are completed by similarly shaped depressions formed on the horizontal meeting surfaces of an inner pair of mold sections 45, 46. These depressions are disclosed at 47, 48, of Figure 16.

The vertical faces of the inner and outer pair of mold sections which are adapted to be juxtaposed are provided with depressions shaped to form vertically disposed links in interlocked relation with the horizontal links. The link forming cavities which make these vertical links are shown at 49, 50 of Figures 15 and 17.

In addition to the link forming cavities described above, the surfaces of the mold sections are provided with channels which, when the parts are assembled, form a central pouring basin 51, runners 52, ring reservoir 53, and radial gates 54 leading to each link forming cavity.

In some cases, it has been found desirable to extend each inner pair of mold sections to the center of the cylindrical mold, and not provide separate central pieces 55 as disclosed in Figures 12 and 13. This is purely a matter of convenience in making and baking the preformed mold sections, and either form is within the scope of the invention.

In Figures 18 to 22, a somewhat modified and considerably simplified form of apparatus is disclosed. In this case, a plurality of sets of four-part mold sections are circumferentially aligned on the table to form the necessary link cavities, the short gates leading thereto, and the annular reservoir for supplying the cavities with metal. The runners for conveying the metal from a central pour hole to the ring reservoir are made up of a plurality of simple, preformed conduit sections.

The link forming cavities are formed upon the meeting surfaces of outer and inner pairs of mold sections 56, 57, and 58, 59, respectively, in a manner similar to that described above. The inner pair of mold sections of each set are provided with channels 60 which may be assembled to form the annular reservoir. The radial runners leading thereto are formed by channels or grooves in the upper and lower faces, respectively, of blocks 61, and the central pour hole is formed by a two- or three-part hollow plug 62.

This form of the invention presents advantages because of its simplicity and the ease with which the mold sections may be assembled. Molten metal will flow under the influence of centrifugal force from the central pour hole through the runners to the reservoir 60, and from there through the short gates to the interlocking link cavities.

In Figures 23 to 30, another form of apparatus for casting a shot of chain is disclosed, and in this form it is unnecessary to shape mold sections to form a central pouring basin, radially disposed runners, and a ring reservoir. It is only necessary to make a plurality of link forming mold sections, assemble them upon a table, and pour the metal, because the apparatus is provided with a permanent metal receiving trough which performs the several functions of the central pouring basin, the radial arms, and the ring reservoir. Secured to the table 10 by bolts or the like 65 is an upstanding annular member 66 having a downturned flange 67 provided with an outer face 68 which is adapted to form the inner surface of an annular trough 69. Disposed outwardly of the face 68, and in circumferential alignment around the table, are a plurality of four-part mold sections having link forming cavities on their meeting surfaces and provided with gates opening into the trough 69. The inner sections may conveniently be held in place by a cylindrical casing 15, bolts 17, cover plate 16, and an inner set of bolts 70 extending through the inner pairs of mold sections.

The radially inner surfaces 71 of the inner mold sections are shaped to cooperate with the surface 68 to form the aforementioned molten metal receiving groove.

The disposition of the grooves upon the meeting surfaces of the mold sections to form interlocking link cavities and inwardly opening gates will be apparent from a consideration of Figures 23 to 27, and Figures 34 to 36, and it is thought unnecessary to give a detailed description thereof.

Figure 28:
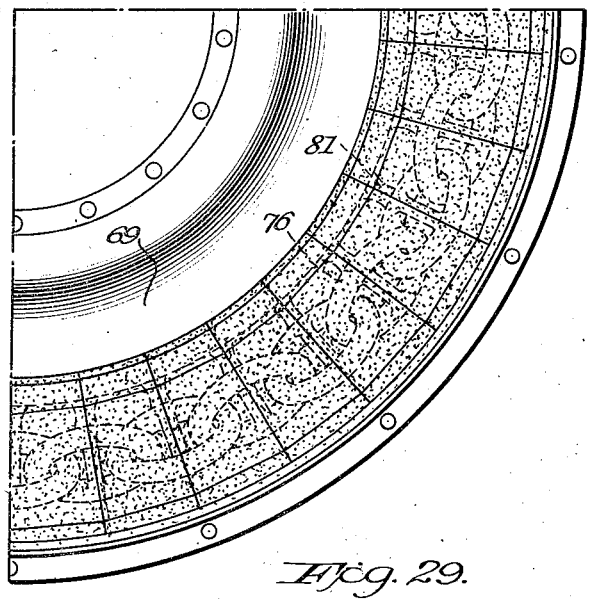
Figure 28 is a fragmentary plan view, with the cover plate removed, of an apparatus generally similar to that disclosed in Figure 23 but having a different arrangement of mold sections or cores.
Figure 29:
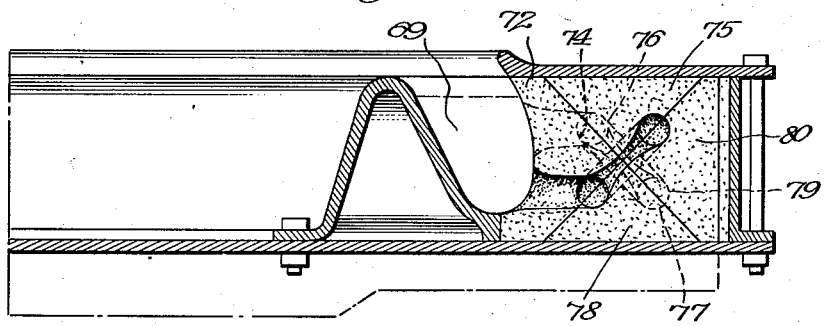
Figure 29 is a vertical sectional view of Figure 28.
Figure 30:
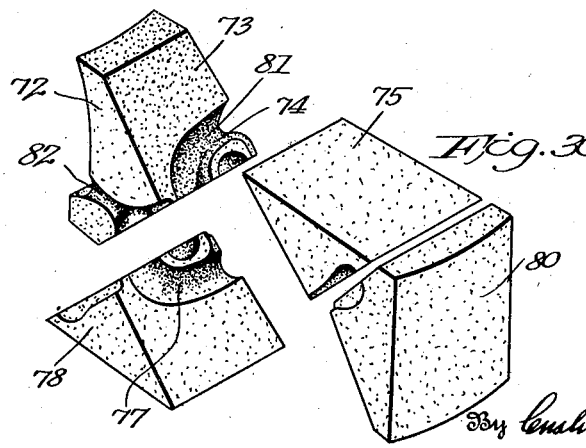
Figure 30 is an isometric view showing one set of mold cores, the individual elements of which are spaced apart to show their details.

The form of the apparatus shown in Figures 28 to 30 differs from that of Figures 23 to 27 principally in the specific construction of the mold sections. In the previously described apparatus, the link forming mold cavities are disclosed, respectively, on horizontal and vertical planes. Since difficulty is occasionally encountered in flowing the metal by centrifugal force to the vertical link cavities, and because in some cases the pressure resulting from centrifugal force will not be the same in the vertical and horizontal link cavities, it has been found desirable to dispose all of the link cavities in planes intersecting the vertical at an angle of substantially 45°. One set of link cavities will be positioned at an angle of 90° with respect to the other set, but both sets will be at 45° to the vertical. Thus, the pressure of the metal in all of the cavities will be uniform, and they will all be fed by centrifugal force with equal facilitity.

The mold sections may conveniently be formed substantially as disclosed in Figures 29 and 30. The innermost section 72 has, upon its upper surface 73, a groove or depression 74 which is adapted to form one-half of a quarter link cavity. The groove which cooperates with the groove 74 to form the other half of the same quarter link cavity is formed upon the inner, undersurface of the mold section 75 and is indicated at 76, Figure 29.

Another quarter of the same link cavity is formed by a groove 77 located upon the outer surface of the bottom mold section 78, and a corresponding groove 79 formed on the undersurface of the outermost mold section 80. This link forming cavity is completed by similar surfaces formed upon the next adjacent set of mold sections. The gate for feeding the same is formed by channels 81 located on the vertical faces of the mold sections. One half of an interlocking link forming cavity is formed by channels located in the other surfaces of the mold section 72, 75, 78, 80. This cavity is fed through a gate 82 formed in the other vertical face of the innermost mold section 72 and the corresponding section of the set of sections adjacent thereto.

In operation, the form of apparatus disclosed in Figures 24 and 29 may be rotated and molten metal then poured into the trough 69, or the trough may be partially filled before rotation is commenced. The molten metal is forced by centrifugal force outwardly through the gates and conducted to the link cavities, where it is maintained under pressure until the castings have solidified. As stated above, complete uniformity and density of the individual chain links is a marked advantage of the second form.

Figure 31:
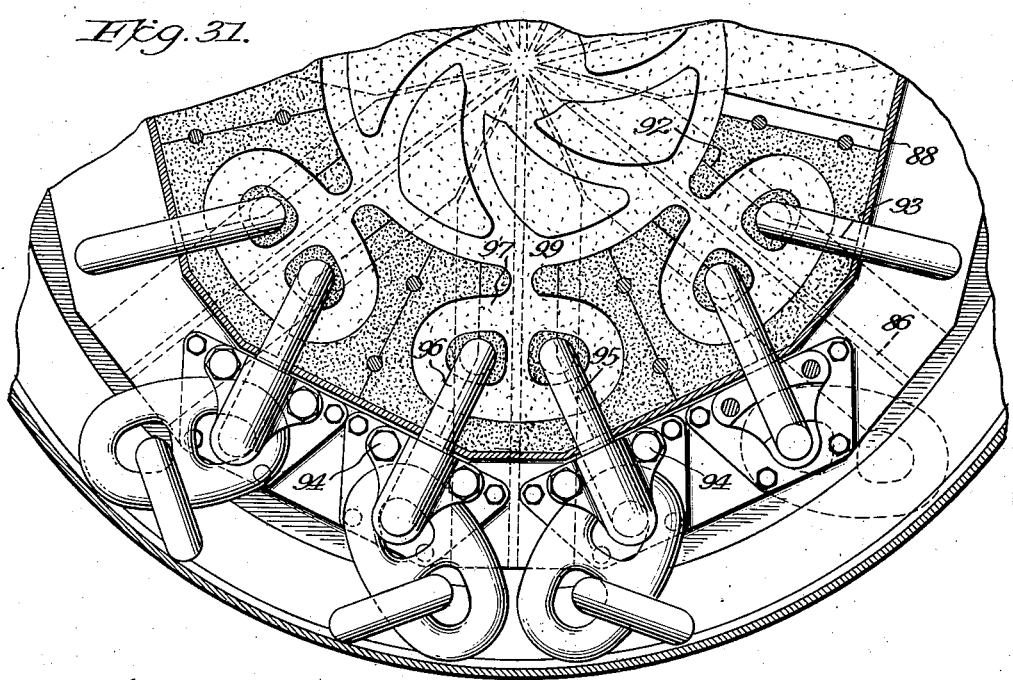
Figure 31 is a fragmentary horizontal sectional view, taken on the parting line between the cope and drag mold sections, of an apparatus for joining by centrifugal casting a plurality of precast shots of chain.
Figure 32:
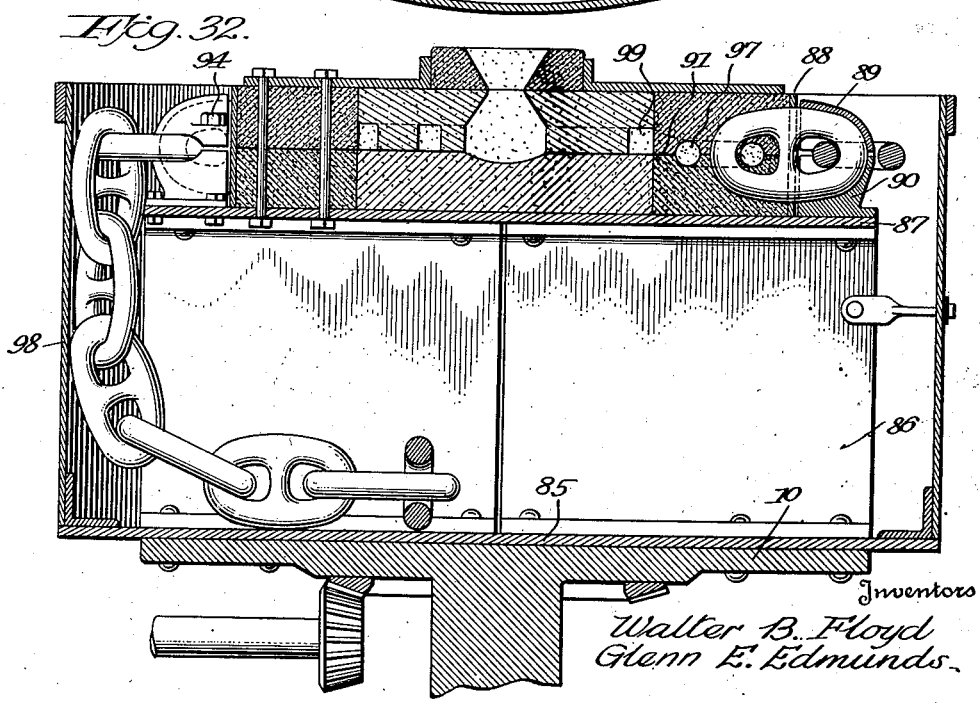
Figure 32 is a vertical axial sectional view of the complete apparatus of Figure 31.

In Figures 31 and 32, an apparatus is disclosed which is adapted to centrifugally cast individual chain links in interlocked relation to the end links of previously formed shots or lengths of chain. Preferably, the shots of chain are cast by one or another of the methods outlined above, or by the methods to be described below, so that when the operation is complete, a long stretch of chain has been formed, each individual link of which has the advantageous characteristics resulting from a centrifugal casting operation.

Upon the table 10 a circular plate 85 is secured, and the space thereabove is divided into a plurality of sector shaped compartments by radially disposed I-beams 86, appropriately riveted in place. The partition members 86 support an upper platform 87, upon which are mounted the mold sections for casting the new links. The platform 87 also supports a continuous flask side wall 88 and a plurality of two-part link clamps 89 and 90. Inside of the wall of the flask are a plurality of sectional molds which are separable on horizontal and vertical planes, and which have their meeting surfaces shaped to form vertically disposed cavities adapted to receive precast end links of individual shots of chain, and other surfaces to form horizontally disposed interlocking link cavities. The mold sections part upon a horizontal plane 91 and upon vertical planes 92, 93.

A shot of preformed chain is placed in each of the compartments between the table 10 and the platform 87, and the end links thereof are secured in the clamps 89, 90, and held in place by bolts 94. The arrangement is such that the end links 95, 96 of adjacent shots of chain are positioned next to each other so as to have a new link cast in interlocking relation to them in horizontal link cavity 97.

After the several shots of chain have been secured in this manner, the machine as a whole is rotated, and the free links of each shot are prevented from flying outwardly under centrifugal force by a casing 98 which is spaced outwardly from the open sides of the several compartments. Molten metal under the influence of centrifugal force flows to the link forming cavities 97 from the ring reservoir 99, and is maintained therein under pressure until the metal has solidified. Thus, a plurality of short lengths of chain are joined together by the method of the present invention, by centrifugally cast chain links having the same characteristics as the precast links.

The present invention includes methods of simultaneously casting a plurality of shots of chain by centrifugally flowing metal to a plurality of molds arranged for revolution about a vertical axis in tiers, and it also includes a number of forms of apparatus for carrying out these methods. If desired, a plurality of blooms may be simultaneously cast by assembling appropriately shaped molds in tiers upon a rotatable table, to provide a plurality of annular, bloom-forming cavities, one above another. This phase of the invention will now be described.

In Figure 33, a form of apparatus somewhat similar to the forms of Figures 24 and 29 is disclosed. A molten metal receiving trough 69 is formed between the outer face 67' of an elongated upstanding annular member 66' and the inner faces of a plurality of tiers of mold sections. Each tier is is made up of a plurality of sets of four-part mold sections which are generally similar to the sections of Figure 24. The horizontal and vertical meeting faces of the individual units are provided with channels which, when assembled, form horizontal and vertically disposed link forming cavities and gates opening into the trough. One tier is made up of a plurality of circumferentially aligned sets, the four parts of which are shown in Figure 33 at 100, 101, 102, and 103. The tier thereabove is formed of a plurality of similar sets of four-part mold sections indicated generally by 104. Any convenient number of tiers of mold sections can be used, depending entirely upon the number of chain lengths which it is desired to cast during one operation. The inner section of the lowermost tier of mold elements is provided with an inwardly extending body portion which cooperates with the lower end of annular member 66' to form the bottom of the metal receiving trough. The inner sections of the upper tier is also extended inwardly beyond the others, as indicated at 105, to provide an overhanging edge to prevent metal from overflowing under influence of centrifugal force.

If it is desired to merely cast a plurality of independent, non-interlocked shots of chain, the individual sets of mold sections in the various tiers may be vertically aligned with one another. On the other hand, if it is desired to connect an end link of each tier with an end link of the tier thereabove, it has been found convenient to stagger the sets from tier to tier, as indicated diagrammatically in Figure 37. When this is done, certain of the mold sections may be provided with additional grooves and channels shaped to form interconnecting links extending between two tiers. As a result, a continuous length of chain extending from the top tier through the intermediate tiers and including the bottom one may be cast in a single operation.

In Figures 38 to 41, a similar arrangement is disclosed, but in this case, the large annular pouring trough is not provided, and the molten metal is preferably fed from a central pour hole. The tiers of mold sections are built up in much the same manner, and the individual elements of the tiers have horizontal and vertical surfaces shaped to provide interlocking link forming cavities.

Spaced a suitable distance inwardly from the inner faces of the tiers are a plurality of upstanding blocks 106 which form the inner wall of an annular reservoir 107 coextensive in height with the tiers. A central pour hole 108 is made by inserting in the flask a preformed conduit 109. This conduit communicates at its lower end with four horizontally disposed runners 110 which are formed in blocks 111. The runners communicate at their lower ends with the reservoir 107 so that molten metal under the influence of centrifugal force can flow outwardly in the runners and upwardly in the reservoir to each of the gates leading to the link cavities. Referring to Figure 41, the manner in which a vertical end link forming cavity 112 may be connected to an end link cavity 113 of the next tier thereabove by an interconnecting link cavity is disclosed. The vertical meeting faces of the sections of two vertically aligned sets of mold sections in adjacent tiers are provided with channels or grooves shaped to form a vertical link with its longer axis extending upwardly. The half of the link cavity 114 shown in elevation in Figure 41 is formed in the vertically aligned faces of eight mold sections, and the other half thereof will be formed in the corresponding vertically aligned faces which are juxtaposed thereon. Thus, the two lower tiers of link forming cavities are interlocked by an intermediate link cavity.

The interconnecting link cavity 115 disclosed in Figure 40 for the two upper tiers of link cavities is formed in substantially the same manner. The manner in which the vertical faces of the mold sections are juxtaposed to form this link cavity 115 is shown in Figure 38.

All of the link cavities in this form of the invention are fed by the gates 116 communicating with the annular reservoir.

In Figures 42 to 47 a somewhat modified form of apparatus is shown for centrifugally casting a plurality of independent, unconnected shots of chain. The mold sections in this case are provided, in addition to the vertical link forming cavities 117 and horizontal link forming cavities 118, and gates 119, with vertical passages 120 adapted to act as riser conduits for the molten metal.

The lowermost tier of mold sections is also provided with surfaces shaped to form an annular conduit, or reservoir 121 in communication with each of the risers 120. The sets of mold sections of the various tiers are vertically aligned, and the risers 120 are coextensive in height with the several tiers. Each riser serves one vertical row of link forming cavities, and is in communication therewith through one vertical row of gates.

In operation, molten metal flows under the influence of centrifugal force from the pouring basin 122, outwardly through the runners 123 and to the annular conduit or reservoir 121. From this point, the metal, under the influence of centrifugal force, will flow upwardly in the riser conduits and outwardly to the link cavities through the gates communicating therewith.

Figures 48 and 49 disclose an apparatus which is similar to the machine of Figures 42 to 47 but differs therefrom in that the mold sections form independent, non-interlocking links. A plurality of tiers of link forming molds are arranged one above the other, and, if desired, a number of circumferentially aligned concentric rows of sections may be provided. The metal is fed through the runners 124 to the annular reservoir 125, and then upwardly in the independent riser conduits 126. The metal flows from these conduits outwardly into the link cavities 127, 128 under the influence of centrifugal force.

In Figures 50 to 52, inclusive, an apparatus for forming other objects than chain links is disclosed. In the specific embodiment illustrated, a plurality of valve bodies are adapted to be simultaneously cast by a centrifugal casting operation, but it will be understood that the present invention will find usefulness in casting any other objects. The drag section 130 of the mold is provided with a plurality of depressions shaped to form the exterior of the lower half of a valve body. The drag also is provided with a plurality of gates 131, 132 leading to each cavity, and a ring reservoir 133. The cope section 134 has its face shaped to form the upper half of the valve body, and a core member 135 may be inserted therein to form the hollow interior of the valve body.

Molten metal may be fed to the ring reservoir by any appropriate means, such as radial runners 136 communicating at their inner ends with a central pour hole 137.

It will be noted that in each of the embodiments of the invention illustrated, the article forming cavities are arranged in circumferential alignment upon a rotatable table, to be revolved about the axis thereof. Thus, metal in the mold cavities is subjected to the pressure of centrifugal force resulting from the bodily revolution of the same about the axis of the table. The metal is supplied in all cases to the article forming cavities from an annular reservoir or the like located adjacent thereto by communication through relatively short gates. Such an arrangement of parts makes it possible to perform a new centrifugal casting method, since it facilitates filling the mold cavities and insures that there is always available an adequate supply of molten metal under pressure to compensate for cooling shrinkage or the like.

It will be seen that we have disclosed a generic method and apparatus, and a number of species thereof which accomplish the stated objects of the invention and which present marked advantages over casting methods and apparatus heretofore known to those skilled in the art.

We claim:—

1. The method of casting chain which comprises forming an annular body of molten metal, subjecting the same to the influence of centrifugal force and thereby flowing the metal outwardly from said body, conducting said metal along a plurality of independent, substantially radially disposed paths to a plurality of outwardly disposed, independent interlocking link cavities, forcing the metal into said cavities under the influence of said centrifugal force, and subjecting the molten metal in the cavities to the pressure of centrifugal force until the same has at least partially cooled and solidified.

2. The method of casting chain which comprises pouring molten metal and subjecting the same to centrifugal force and thereby flowing the same into the form of an annular body, subjecting the annular body to the influence of centrifugal force and thereby flowing metal outwardly from said body, conducting said metal along a plurality of independent substantially radially disposed paths to a plurality of outwardly arranged independent, interlocking link cavities, forcing the metal into said cavities under the influence of said centrifugal force and subjecting the molten metal in the cavities to the pressure of centrifugal force until the same has at least partially cooled and solidified.

3. The method of casting which comprises subjecting an annular body of molten metal to centrifugal force and thereby flowing the metal from said annular body to a plurality of mold cavities arranged in circumferential alignment, concentric to said body, subjecting the molten metal to the pressure of centrifugal force in said cavities, equalizing the pressure of the molten metal in each of said cavities by the free communication from one to another through said annular body of molten metal, and cooling and solidifying the metal in said cavities while under such equalized pressure.

4. The method of casting which comprises subjecting an annular body of molten metal to centrifugal force and thereby flowing the metal from said annular body to a plurality of independent mold cavities arranged circumferentially thereof, subjecting the molten metal in said cavities to the pressure of centrifugal force, cooling and solidifying the metal in said cavities while under such pressure, and compensating for cooling shrinkage of said metal in said cavities by supplying additional metal from said annular body under the influence of centrifugal force, whereby a plurality of uniform, dense castings are produced.

5. The method of simultaneously casting a plurality of interlocked chain links to form a shot of chain, which comprises assembling a plurality of mold sections to form substantially closed, independent, interlocked link cavities in circumferential alignment about the axis of a rotatable table, providing on said table inwardly of said mold sections an annular trough and a plurality of radial gates leading therefrom to said link cavities, rotating said table, pouring molten metal into said trough, flowing the metal through said gates and into said cavities by the centrifugal force of rotation of said table, continuing said centrifugal force, and solidifying the metal in said cavities under the pressure resulting from said continued centrifugal force, whereby to produce a plurality of dense, compact castings.

6. The method of casting chain which comprises providing a table mounted for rotation about a vertical axis, assembling a plurality of mold sections on said table to form an axial pouring basin, a plurality of substantially radially extending runners leading from said basin to an annular reservoir concentric to said basin, a plurality of link mold cavities arranged in circumferential alignment concentric to said axis, and a plurality of short gates from said reservoir to said cavities; rotating said table and the mold sections assembled thereon, pouring molten metal into said basin, flowing the same through said radial runners to said annular reservoir, flowing said metal by centrifugal force from said reservoir through said gates to said link cavities, and solidifying the metal in said cavities while maintaining the same under the pressure of centrifugal force.

7. The method of casting chain, which comprises forming a plurality of mold sections with surfaces adapted, when the sections are assembled, to provide a set of horizontal link cavities and a set of vertical link cavities interlocked therewith, an annular reservoir, and gates leading therefrom to the horizontal link cavities, partially assembling said sections, inserting precast links in the vertical link cavities; completing the assembly of the sections, substantially filling said reservoir with molten metal; flowing the same to the horizontal link cavities; and maintaining said molten metal therein under the pressure of centrifugal force until said metal has solidified, whereby dense compact links are cast in interlocked relation to said precast links.

8. The method of casting chain which comprises forming a plurality of mold sections with surfaces adapted when the sections are assembled to provide two sets of link cavities lying in planes disposed at right angles to each other and at 45° angles to a vertical plane, and gates leading to said cavities; assembling said sections in circumferential alignment upon a rotatable table with said gates leading from an annular, inwardly disposed reservoir outwardly to the innermost portion of each of said link cavities; rotating said table; pouring molten metal to said reservoir and flowing the same under the influence of centrifugal force through said gates and into said mold cavities, and continuing the rotation of said table to maintain the metal in said cavities under the pressure of centrifugal force until the same has partially cooled and solidified, whereby a plurality of uniformly dense, interlocking links are simultaneously cast.

9. The method of casting articles which comprises forming the surfaces of a plurality of mold sections with depressions adapted to be assembled to form a plurality of mold cavities and passages leading thereto, assembling said sections with the depressions juxtaposed to provide a plurality of circumferentially aligned article forming cavities, an annular reservoir disposed radially inwardly of said cavities, and a plurality of gates therebetween, flowing molten metal into said reservoir and subjecting the same to centrifugal force, flowing the metal from the reservoir through the gates to the article forming cavities by said centrifugal force, continuing the centrifugal force to maintain the metal in the cavities under pressure until the same has solidified and partially cooled, whereby a plurality of dense compact castings are produced.

10. The method of casting chain which comprises assembling upon a circular rotatable table, an annular set of preformed mold sections to provide a circular row of interlocking link cavities disposed in horizontal alignment around the table in concentric relation to the axis thereof, and an inwardly opening gate for each cavity, assembling another similar set of mold sections above the first set, pouring molten metal into the form of an annular body radially inwardly of the link cavities and subjecting said metal to centrifugal force by rotation of said table, flowing the metal from said annular body by centrifugal force to said gates and into said rows of mold cavities, and maintaining the metal therein under the pressure of centrifugal force until the same has partially cooled and solidified, whereby two lengths of interlocking chain links are simultaneously cast in said two rows of cavities.

11. The method of casting a chain which comprises assembling upon a rotatable table, an annular set of preformed mold sections to provide a circular row of interlocking link cavities disposed in horizontal alignment around the table in concentric relation to the axis thereof, and an inwardly opening gate for each cavity, assembling a plurality of similar sets of mold sections in tiers upon the first set and providing an interlocking link cavity connecting one cavity of each tier with an adjacent cavity of the next tier thereabove, pouring molten metal into the form of an annular body radially inwardly of the link cavities and subjecting said metal to centrifugal force by rotation of said table, flowing the metal from said annular body by centrifugal force to said gates and into said tiers of link cavities and the cavities connecting said tiers, and maintaining the metal therein under the pressure of centrifugal force until the same has partially cooled and solidified, whereby a continuous length of interlocking chain links extending from the lowermost to the uppermost tier is simultaneously cast.

12. The method of casting relatively long lengths of chain which comprises casting a plurality of shots of chain, assembling the same upon a rotatable support with adjacent end links of different shots inserted in a link mold having a link cavity surrounding said precast end links, rotating the support, the shots of chain and the mold, and centrifugally casting a new link connecting adjacent end links of the previously cast shots of chain.

13. A centrifugal casting apparatus comprising a table mounted for rotation about a vertical axis, and a plurality of mold sections secured thereon in concentric relation to said axis, said mold sections having surfaces formed, when assembled, to provide an annular reservoir concentric to the axis of rotation of said table, a plurality of radial gates leading outwardly from said reservoir, and a plurality of articles forming cavities communicating with the outer ends of said gates, whereby rotation of said table and the mold will cause molten metal in said annular reservoir to flow under centrifugal force therefrom to said mold cavities.

14. A centrifugal casting apparatus comprising a table mounted for rotation about a vertical axis, and a plurality of mold sections secured thereon in concentric relation to said axis, said mold sections having surfaces formed, when assembled, to provide an axial pouring basin, outwardly extending runners leading therefrom, an annular reservoir at the outer ends of said runners concentric to the axis of rotation of said tables, a plurality of radial gates leading outwardly from said reservoir, and a plurality of article forming cavities communicating with the outer ends of said gates, whereby rotation of said table and the mold will cause molten metal in said reservoir to flow under the centrifugal force from said annular reservoir to said mold cavities.

15. A centrifugal chain casting apparatus comprising a table mounted for rotation about a vertical axis, a plurality of mold sections, and means for securing the latter upon said table, said mold sections having surfaces shaped, when assembled, to provide a plurality of circumferentially aligned, independent link cavities, gates leading to the cavities, and an annular reservoir for molten metal disposed radially inwardly of said cavities and in free communication therewith through said gates, whereby molten metal in said reservoir will flow from said reservoir to said cavities under the influence of centrifugal force resulting from rotation of the table, the metal remaining in said reservoir serving to compensate for shrinkage during cooling of the castings.

16. A centrifugal chain casting apparatus comprising a table mounted for rotation about a vertical axis, a plurality of mold sections and cores, and means for securing the latter upon said table, said mold sections and cores having surfaces shaped, when assembled, to provide a plurality of circumferentially aligned, independent, interlocking, horizontally and vertically disposed link cavities, gates leading to the cavities, and an annular reservoir for molten metal disposed inwardly of and communicating with said cavities through said gates, whereby molten metal in said reservoir may flow directly to said cavities under the influence of centrifugal force resulting from rotation of the table, and may serve to compensate for shrinkage during cooling of the castings.

17. A centrifugal chain casting apparatus comprising a table mounted for rotation about a vertical axis, cope and drag mold sections including a plurality of cores, and means for securing the same upon said table, said cope and drag sections having surfaces shaped to form an annular reservoir disposed in concentric relation to said table, and short radial gates extending outwardly from the reservoir to a plurality of interlocking horizontally and vertically disposed link cavities, said horizontally disposed link cavities being formed partially by surfaces in said cope and drag sections and partially by surfaces in said cores, and said vertically disposed cavities being formed entirely by surfaces in said cores.

18. A centrifugal chain casting apparatus comprising a table mounted for rotation about a vertical axis, cope and drag mold sections including a plurality of cores, and means for securing the same upon said table, said cope and drag sections having surfaces shaped to form a central pouring basin, a plurality of outwardly extending runners, an annular reservoir at the ends of said runners in concentric relation to said table, and short radial gates extending outwardly from the reservoir to a plurality of interlocking horizontally and vertically disposed link cavities, said horizontally disposed link cavities being formed partially by surfaces in said cope and drag sections and partially by surfaces in said cores, and said vertically disposed cavities being formed entirely by surfaces in said cores.

19. An apparatus for casting chain centrifugally comprising a rotatable table, a cylindrical mold comprising a plurality of sets of mold sections, and means for securing the same in assembled relation upon the table, each set of mold sections comprising four parts adapted to be assembled to form substantially a sector of the cylindrical mold, said parts of the several sets having mating surfaces shaped to form, when assembled, an annular molten metal reservoir, gates leading radially outwardly therefrom and two sets of respectively horizontally and vertically disposed link forming cavities, whereby rotation of said table and said mold will cause molten metal placed in said reservoir to flow under centrifugal force through said gates to said link cavities to produce centrifugally cast chain.

20. An apparatus for casting chain centrifugally comprising a rotatable table, a cylindrical mold comprising a plurality of sets of mold sections, and means for securing the same in assembled relation upon the table, each set of mold sections comprising six parts adapted to be assembled to form substantially a sector of the cylindrical mold, said parts of the several sets having mating surfaces shaped to form, when assembled, a central pouring basin, runners extending outwardly therefrom, an annular molten metal reservoir at the outer ends of said runners, gates leading radially outwardly therefrom and two sets of respectively horizontally and vertically disposed link forming cavities, whereby rotation of said table and said mold will cause molten metal placed in said reservoir to flow under centrifugal force through said gates to said link cavities to produce centrifugally cast chain.

21. A centrifugal chain casting apparatus comprising a rotatable table, a cylindrical flask mounted thereon, and core sections disposed within said flask, certain of said core sections having surfaces shaped to form, when assembled, a plurality of independent, interlocked, vertically and horizontally disposed link forming cavities and a continuous annular molten metal reservoir disposed radially inwardly of said cavities and connected thereto by open gates, another of said core sections having surfaces shaped to form, when assembled, a central pouring basin and radial runners extending outwardly therefrom to said reservoir, whereby molten metal may flow under centrifugal force resulting from rotation of said flask, from said central basin through said runners to said reservoir and then to said cavities.

22. A machine for casting chains centrifugally, comprising a substantially circular table rotatable on a vertical axis and having thereon a continuous, upwardly extending, outwardly facing surface concentric to the axis of rotation, and a plurality of mold sections arranged in concentric relation outwardly of said surface and each having an inwardly facing surface disposed, when the sections are assembled, to form with said outwardly facing surface, an annular trough, said mold sections having surfaces shaped to form independent interlocking link cavities and radial gates opening into said trough, whereby molten metal from an annular body in said trough will flow through said gates into said cavities under the influence of centrifugal force resulting from rotation of said table.

23. A machine for casting chains centrifugally comprising a table rotatable on a vertical axis and having secured thereon an upwardly extending annular member having a continuous, outwardly facing surface concentric to the axis of rotation of the table, a plurality of mold sections arranged in concentric relation outwardly of said member to form therewith an annular trough, said mold sections having surfaces shaped to form independent interlocking link cavities and radial gates opening into said trough, whereby molten metal from an annular body of molten metal in said trough will flow through said gates into said cavities under the influence of centrifugal force resulting from rotation of said table.

24. A machine for casting chain centrifugally comprising a table rotatable on a vertical axis, an upstanding flange on said table disposed to concentric relation to the axis of rotation thereof, a plurality of mold sections positioned on the table outwardly of said flange, and means for securing the parts upon said table, said flange and mold sections having surfaces shaped to form an annular molten metal receiving trough, said mold sections having surfaces shaped to form independent, interlocking link cavities and radial gates opening into said trough, whereby part of an annular body of molten metal in said trough will flow through said gates into said cavities under the influence of centrifugal force resulting from rotation of said table.

25. A machine for casting chains centrifugally comprising a table mounted for rotation on a vertical axis, said table having secured thereon an upwardly extending annular member having a continuous outwardly facing surface concentric to the axis of rotation of the table, a plurality of mold sections arranged in tiers in concentric relation and spaced outwardly from said member, the inwardly facing surface of said tiers of mold sections and the outwardly facing surface of said member being disposed to form an annular trough coextensive in height with said tiers, said mold sections having surfaces shaped to form a plurality of tiers of interlocking link cavities and gates opening therefrom into said trough, whereby an annular body of molten metal will flow under the influence of centrifugal force resulting from rotation of said table, over the outer surface of said trough, and through said gates into said cavities to form a plurality of tiers of interlocking chain links.

26. A machine for casting chain centrifugally comprising a table rotated on a vertical axis, an upwardly extending annular member on said table having a continuous outwardly facing surface concentric to the axis of rotation of said table, and a plurality of mold sections arranged in tiers in concentric relation on said table outwardly of said member, the inwardly facing surface of the tiers of mold sections and the outwardly facing surface of said member being disposed to form an annular trough coextensive in height with said tiers, said mold sections having surfaces shaped to form a plurality of tiers of interlocking link cavities, a link cavity connecting an end link cavity of each tier with a similar cavity in the tier thereabove, and gates opening from each cavity into said trough, whereby an annular body of molten metal will flow under the influence of centrifugal force when said table is rotated, over the outer surface of said trough and through said gates into said cavities to form a plurality of tiers of interlocking chain links, interlocked from tier to tier.

27. A machine for casting chain centrifugally comprising a table rotatable on a vertical axis, an upwardly extending annular member having a continuous, outwardly facing surface concentric to the axis of rotation of said table secured thereon, and a plurality of mold sections arranged in tiers in concentric relation and spaced outwardly from said member, the mold sections in the lowermost tier having surfaces disposed to cooperate with a lower portion of said outwardly facing surface to form the bottom of an annular trough, the inner faces of the tiers of mold sections forming the outer surface of said trough, and the uppermost tier of mold sections having surfaces shaped to form an inwardly extending, overhanging, upper edge for the trough, said mold sections having surfaces shaped to form a plurality of tiers of interlocking link cavities and gates opening therefrom into said trough, whereby an annular body of molten metal in said trough will flow to the outer surface thereof and through said gates into said cavities under the influence of centrifugal force resulting from rotation of said table, to form a plurality of tiers of interlocking chain links.

28. A chain casting machine comprising a rotatable table, a cylindrical flask secured thereon and a plurality of preformed mold sections in said flask, certain of said sections being assembled in circumferential alignment in said flask in tiers to form tiers of interlocking link cavities, and gates opening radially inwardly therefrom, other mold sections being assembled to cooperate with said link forming mold sections to form an annular trough inwardly thereof, and other of said mold sections being assembled in said flask to form a central pour hole and radial runners leading therefrom to said trough, whereby molten metal introduced into said pour hole will flow to said trough and will flow upwardly therein under the influence of centrifugal force when the table and flask are rotated, to fill said link cavities and form a plurality of tiers of centrifugally cast chain.

29. An apparatus for casting chain comprising a rotatable table, a cylindrical flask secured thereon, and a plurality of preformed mold sections in said flask, certain of said sections being assembled in circumferential and vertical alignment in said flask in tiers to form tiers of vertically aligned interlocking link cavities, a gate opening radially inwardly from each cavity, and a riser conduit communicating with each vertical row of gates, each of said riser conduits being in communication at its lower end with an annular molten metal conduit substantially aligned with the lowermost tier of link mold sections, certain other of the sections in said flask being assembled to provide a central pour hole, and a plurality of radial runners extending therefrom to said annular conduit, whereby molten metal introduced into said pour hole will flow through said runners to said annular conduit, and upwardly in said risers to said gates and said link cavities under the influence of centrifugal force when the table and flask are rotated, to fill said link cavities and form a plurality of tiers of centrifugally cast chain.

30. An apparatus for casting chain comprising a rotatable table, means on the table for receiving a plurality of preformed shots of chain, means for securing the end links of adjacent shots in predetermined relation, and means for centrifugally casting a new link in interlocking relation to said end links upon rotation of said rotatable table.

31. An apparatus for casting chain comprising a rotatable table, a plurality of compartments adapted to receive a plurality of preformed shots of chain disposed symmetrically about the axis of rotation of the table, a plurality of link forming mold sections supported by said table and arranged in circumferential alignment about said axis, means for clamping the end links of shots of chain disposed in adjacent compartments in predetermined relation to said mold sections with a link forming cavity thereof interlocked with the end links of each adjacent pair of shots, and means for flowing molten metal to said link cavities under the influence of centrifugal force resulting from rotation of said table, whereby said shots are joined by interlocking, centrifugally cast chain links.

32. An apparatus for centrifugally casting chain comprising means for supporting a plurality of precast shots of chain in position to be bodily revolved about a vertical axis, means for clamping the end links of each shot in predetermined relation for revolution about said axis, a plurality of mold sections mounted for revolution about said axis and having surfaces shaped to form link cavities interlocked with the end links of different shots, and rotatable means for feeding molten metal to said link cavities under the influence of centrifugal force to form a plurality of centrifugally cast chain links interlocking said precast end links to produce a continuous length of chain from said shots.

33. An apparatus for joining preformed shots of chain comprising a table mounted for rotation about a vertical axis, a platform spaced above the table top and supported for rotation therewith, a plurality of mold sections arranged symmetrically about said axis on said platform, clamping means associated with said mold sections adapted to secure end links of said shots of chain in predetermined relation to said mold sections, and means on said platform for centrifugally feeding molten metal to said mold sections when said table is rotated to form a plurality of centrifugally cast chain links interlocking the end links of different preformed shots of chain.

34. An apparatus for joining preformed shots of chain comprising a table mounted for rotation about a vertical axis, radially disposed partition means dividing the space above the table top into a plurality of compartments, a platform spaced above the table and supported on said partition means for rotation therewith, a plurality of mold sections arranged symmetrically about said axis on said platform, clamping means associated with said mold sections adapted to secure end links of said shots of chain supported therebelow in said compartments in predetermined relation to said mold sections, and means on said platform for centrifugally feeding molten metal to said mold sections when said table is rotated, to form a plurality of centrifugally cast chain links interlocking the end links of different preformed shots of chain.

35. An apparatus for joining preformed shots of chain comprising a table mounted for rotation about a vertical axis, radially disposed partition means dividing the space above the table top into a plurality of compartments adapted to receive said preformed shots of chain, a circumferentially disposed upstanding cylindrical wall associated with said compartments for preventing outward movement of said shots therefrom, a platform spaced above the table top and supported on said partition means for rotation therewith, a plurality of mold sections arranged symmetrically about said axis on said platform, clamping means associated with said mold sections adapted to secure end links of said shots of chain supported therebelow in said compartments in predetermined relation to said mold sections, and means on said platform for centrifugally feeding molten metal to said mold sections when said table is rotated, to form a plurality of centrifugally cast chain links interlocking the end links of different, preformed shots of chain.

WALTER B. FLOYD.
GLENN E. EDMUNDS.